(12) United States Patent  (10) Patent No.: US 8,436,578 B2
Smith  (45) Date of Patent: May 7, 2013

(54) APPARATUS FOR RETENTION OF BATTERY IN CHARGER

(75) Inventor: Dwight D Smith, Bedford, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 1859 days.

(21) Appl. No.: 10/757,146

(22) Filed: Jan. 14, 2004

(65) Prior Publication Data

US 2005/0151507 A1    Jul. 14, 2005

(51) Int. Cl.
*H02J 7/00* (2006.01)
*H01M 2/10* (2006.01)

(52) U.S. Cl.
USPC ........... 320/113; 320/107; 320/110; 320/112; 320/114; 320/115; 429/96; 429/100

(58) Field of Classification Search ............ 320/107, 320/110, 112, 113, 114, 115; 429/96, 97, 429/98, 99, 100
See application file for complete search history.

(56) References Cited

U.S. PATENT DOCUMENTS

| 4,214,197 | A | | 7/1980 | Mann et al. ...................... 320/2 |
|---|---|---|---|---|
| 4,892,486 | A | | 1/1990 | Guzik et al. .................. 439/248 |
| 5,262,710 | A | * | 11/1993 | Taylor ........................... 320/110 |
| 5,844,401 | A | * | 12/1998 | Lee ................................ 320/107 |
| 5,955,700 | A | * | 9/1999 | Slipy et al. ...................... 174/50 |
| 6,350,040 | B1 | | 2/2002 | Parker ............................ 362/183 |
| 6,438,229 | B1 | | 8/2002 | Overy et al. ................... 379/446 |
| 7,299,373 | B2 | * | 11/2007 | Wulff .............................. 713/330 |
| 2002/0011819 | A1 | | 1/2002 | Watson et al. ................ 320/114 |
| 2003/0085685 | A1 | | 5/2003 | Usui et al. ..................... 320/112 |

FOREIGN PATENT DOCUMENTS

CN    1082372 A    2/1994

* cited by examiner

*Primary Examiner* — Edward Tso
*Assistant Examiner* — Johali Torres Ruiz
(74) *Attorney, Agent, or Firm* — Fox Rothschild, LLP; Robert J. Sacco

(57) ABSTRACT

A battery charger assembly includes an outer casing with a sleeve assembled therein having a cavity profiled to receive a battery alone, or a battery and its associated appliance. A cam-operated assembly includes a cam member which moves a gripper assembly into the cavity to grip the battery. In this manner, a battery and/or its appliance may be inserted into the charger, and used in automotive use without the battery and/or the appliance becoming discharged from the charger assembly.

20 Claims, 11 Drawing Sheets

APPARATUS FOR RETENTION OF BATTERY IN CHARGER

BACKGROUND OF THE INVENTION

FIELD OF THE INVENTION

The present invention relates to a battery charger assembly for use in automotive applications, and more particularly, to a charger assembly having a cam-operated gripper assembly for retaining the battery in a charging position.

Many different hand-held, battery-operated electronic devices exist in today's marketplace, for example, cell phones and hand-held radios, such as police band radios. When such batteries become discharged, it is commonplace to position the battery in a charger to recharge the battery. In some charging units, the battery alone can be positioned in a charging unit, and in other charging units, the battery and/or its appliance may be charged.

However, most of these charging units rely on gravity for the battery to be in its proper position within the charger such that the weight of the battery alone moves the battery into a charging registration with charging contacts on the charger assembly. It is also possible to have a latch member on a charging assembly to hold the appliance and battery in a charging registration. However, these types of charging units are not adequate for vehicular use, given the motion which is incumbent upon the battery during normal usage. The object of the invention, therefore, is to overcome these marketplace shortcomings.

SUMMARY OF THE INVENTION

The objects of the invention have been accomplished by providing a battery charger assembly, comprising a housing having a battery receiving cavity, the cavity being profiled to receive at least a battery therein. The housing further comprises an opening though the housing and into the cavity. Electrodes are provided for contacting contacts on the battery for charging the battery. A gripping member is movable transversely into and out of the housing opening, between a locked and unlocked position, for gripping a battery placed within the cavity.

The gripping member is moved by a cam assembly, and the gripping member is comprised of a gripper portion attached to an insert. The cam assembly is comprised of a rotatable cam which operates within a follower groove in the insert. The gripper member is a rubber-like material molded to a plastic insert. The gripper member is substantially U-shaped, with leg portions of the U flanking the insert, and the closed end of the U providing the gripping function. The leg portions of the gripper member are fixed to the housing portion, and the movement of the cam stretches the remainder of the gripper member.

The rotatable cam and the follower groove are contoured for a nested position when in the unlocked position. The rotatable cam and the follower groove are contoured for a detented position when in the locked position.

The battery receiving cavity is profiled to receive a battery alone, or a battery connected to its hand-held appliance. The cavity includes guides along the insertion axis of the cavity for holding the battery alone. The guides are comprised of guide grooves along the insertion axis of the cavity, and are profiled to receive ribs along an exterior of a battery.

In another aspect of the invention, a battery charger assembly comprises a housing having a battery receiving cavity, the cavity being profiled to receive a battery therein alone, or a battery and its appliance therein. The housing further comprises an opening though the housing and into the cavity. Electrodes are provided for contacting contacts on the battery for charging the battery. A cam operated gripping member is movable transversely into and out of the housing opening, between a locked and unlocked position, for gripping a battery placed within the cavity.

The cam operated gripping member is comprised of a gripper portion attached to an insert. The cam operated gripping assembly is comprised of a rotatable cam which operates within a follower groove in the insert. The gripper member is a rubber-like material molded to a plastic insert. The gripper member is substantially U-shaped, with leg portions of the U flanking the insert, and the closed end of the U providing the gripping function. The leg portions of the gripper member are fixed to the housing portion, and the movement of the cam stretches the remainder of the gripper member.

The rotatable cam and the follower groove are contoured for a nested position when in the unlocked position. The rotatable cam and the follower groove are contoured for a detented position when in the locked position. The cam member is operated by a shaft which is connected to the cam member, and extends through to an exterior of the housing.

The cavity includes guides along the insertion axis of the cavity for holding the battery alone. The guides are comprised of guide grooves along the insertion axis of the cavity, and are profiled to receive ribs along an exterior of a battery.

DETAILED DESCRIPTION OF THE PREFERRED EMBODIMENT

Figure 1:
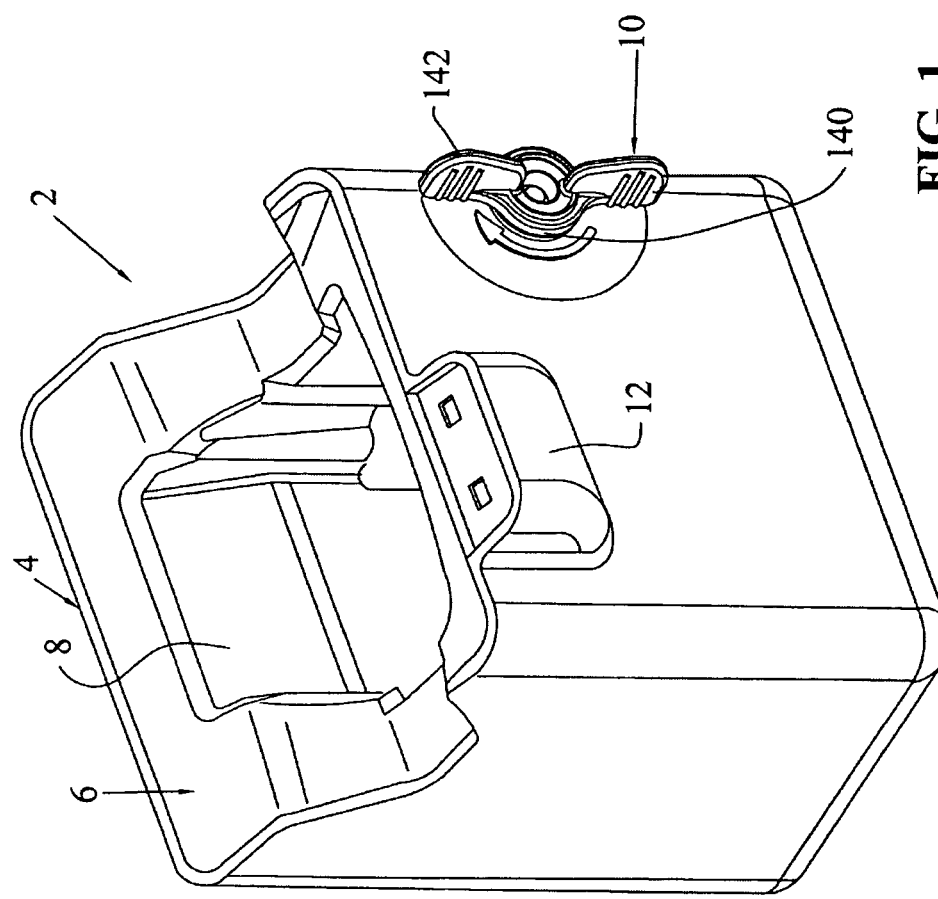
FIG. 1 is a front perspective view of the battery charging unit of the present invention.

With reference first to FIG. 1, a charging unit is shown generally at 2, which is profiled and designed for installation in a vehicle, for charging a single battery alone, or for charging the battery which is attached to its appliance, for example, a short-wave radio. As shown in FIG. 1, charger assembly 2 includes an outer casing housing 4, an inner sleeve at 6, which provides a cavity entry at 8 for receiving a battery to be charged. A locking assembly is shown at 10, which locks the battery and/or battery and appliance in cavity 8 during use in the vehicle. Finally, a battery status indicator is shown at 12 to show that the battery is charging, or is fully charged and ready for use.

Figure 2:
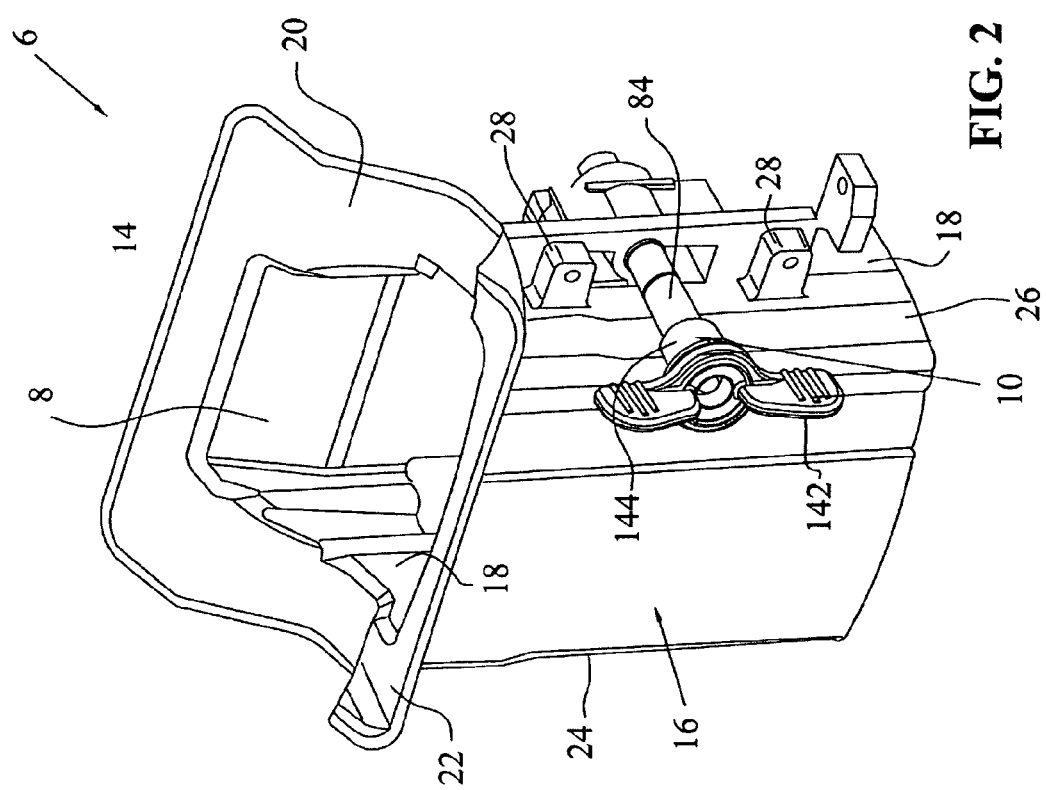
FIG. 2 shows a front perspective view of the inner sleeve portion.

As shown in FIG. 2, sleeve 6 is comprised of sleeve halves 14, 16 having a parting line at 18. Each of the sleeve portions 14, 16 includes an outer ridge portion 20, 22 funneling inwardly towards cavity 8. With respect still to FIG. 2, sleeve portion 16 further includes side walls 24 and 26, where side wall 26 includes mounting bosses 28 attached thereto. With respect now to FIGS. 3 and 4, sleeve portion 14 will be described in greater detail.

Figure 3:
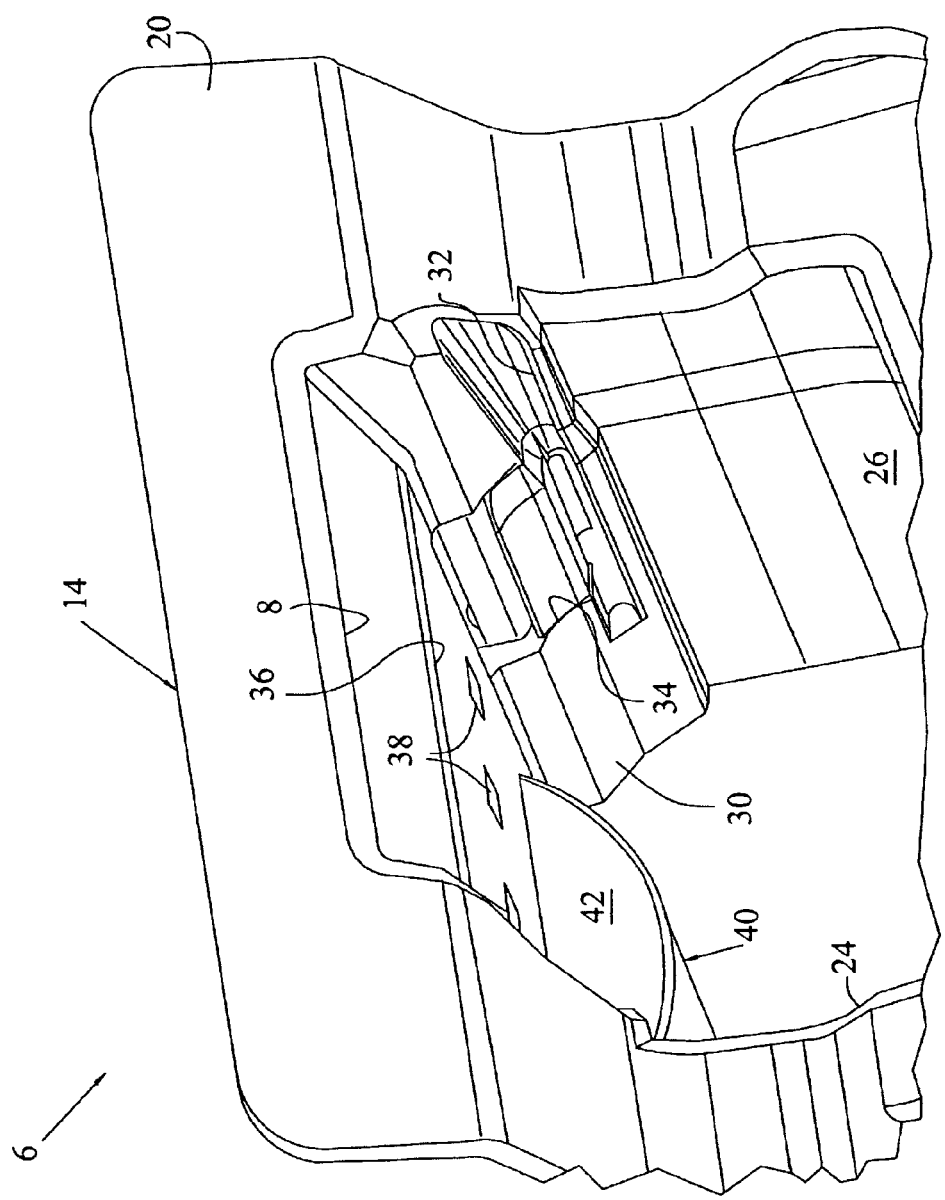
FIG. 3 shows an upper perspective view, partially broken away, looking downwardly into the cavity of the sleeve shown in FIG. 2.

As shown best in FIG. 3, the inner contour includes a curved wall at 30, with an axially extending guide groove at 32 extending along the wall. Opening 34 perforates the wall 30 to access cavity 8 from an outside thereof, as will be described in further detail herein. With reference still to FIG. 3, sleeve portion 14 includes a back wall 36 having openings 38 for receiving charging electrodes (not shown), and further comprises pedestal 40 having an upper surface 42, which forms a platform for receiving an end of the battery to be charged in a resting position.

Figure 4:
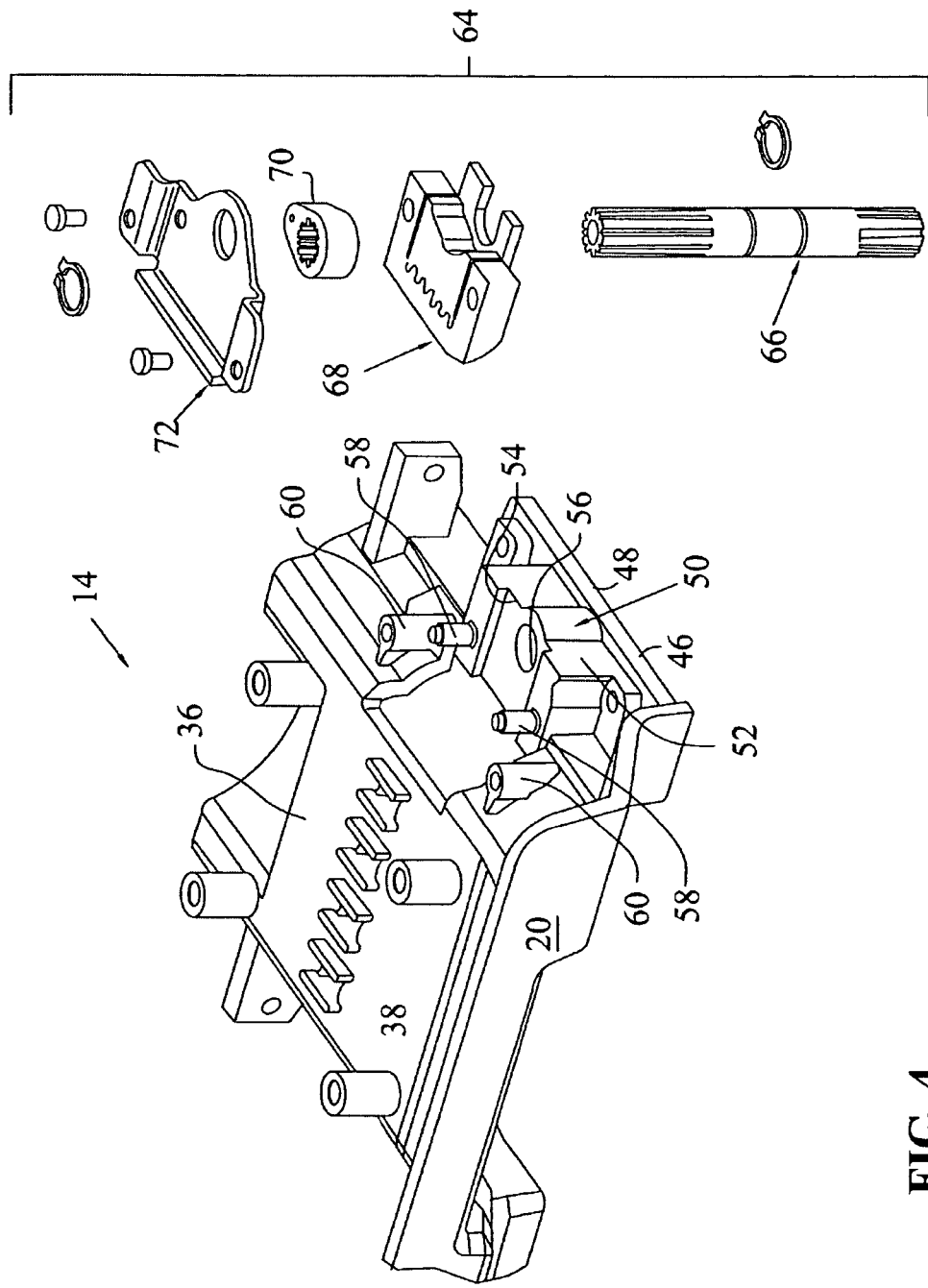
FIG. 4 shows a rear sleeve portion and a portion of the camming assembly in an exploded manner.

With reference now to FIG. 4, sleeve portion 14 will be described in further detail. As shown in FIG. 4, sleeve portion 14 includes a side wall portion 46, which forms the parting line 18, and includes a mounting surface 48 on one side thereof and a mounting portion 50 for the gripper member. Mounting portion 50 includes a mounting pedestal 52 having a recessed portion at 54, with an aperture 56 extending therethrough. Mounting posts 58 flank the recessed portion 54 and bosses 60 flank posts 58.

Figure 5:
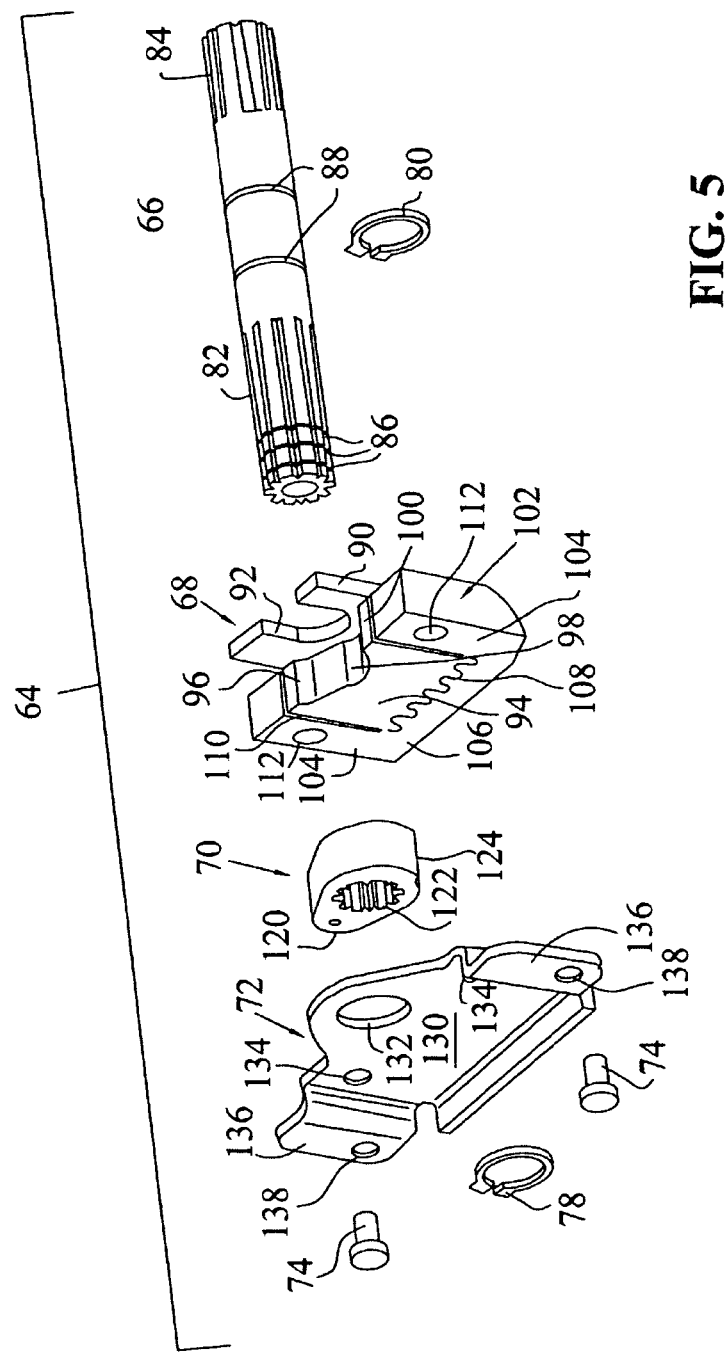
FIG. 5 shows an enlarged view of the camming assembly of FIG. 4.

With reference now to FIGS. 4 and 5, cam actuation mechanism 64 will be described in greater detail. Cam actuation assembly 64 is comprised of a splined shaft 66, gripper member 68, cam 70, gripper cover 72, screws 74, and snap rings 78, 80.

As shown best in FIG. 5, splined shaft 66 includes a first splined end 82 and a second splined end 84. First splined end 82 includes grooves 86 profiled to receive snap ring 78. A center portion of shaft 66 includes grooves 88 profiled to receive snap ring 80.

Gripper member 68 includes a slider member 90 having opening 92, where an insert member 94 is integrally molded with slider 90. Insert member 94 is contoured with a cam follower surface at 96 and includes a detent at 98 and a stop surface at 100. With reference still to FIG. 5, gripper member 68 further includes a friction member 102 provided by a rubber-like structure, where the gripper member 102 is integrally molded to insert member 94. Friction member 102 is substantially U-shaped in construction having leg portions 104 and closed end 106. Friction member 102 is connected to insert member along an interdigitated interface 108, but not along inner side surfaces, for example, at 110, as will be described herein. Finally, apertures 112 extend through leg portions, as will also be described herein. In an embodiment of the invention, friction member 102 is molded from Santoprene®.

As shown in FIG. 5, cam member 70 includes a camming surface at 120, a splined bore at 122, and a scalloped inner surface at 124, which will also be described in further detail. In an embodiment of the invention, cam member 70 is molded from Torlon®.

Gripper cover 72 includes a planar base portion 130 having a central aperture 132 therethrough and locating apertures 134. Gripper cover 72 also includes wing members 136 having mounting apertures at 138. With the above components described, the assembly will now be described in further detail.

Figure 7:
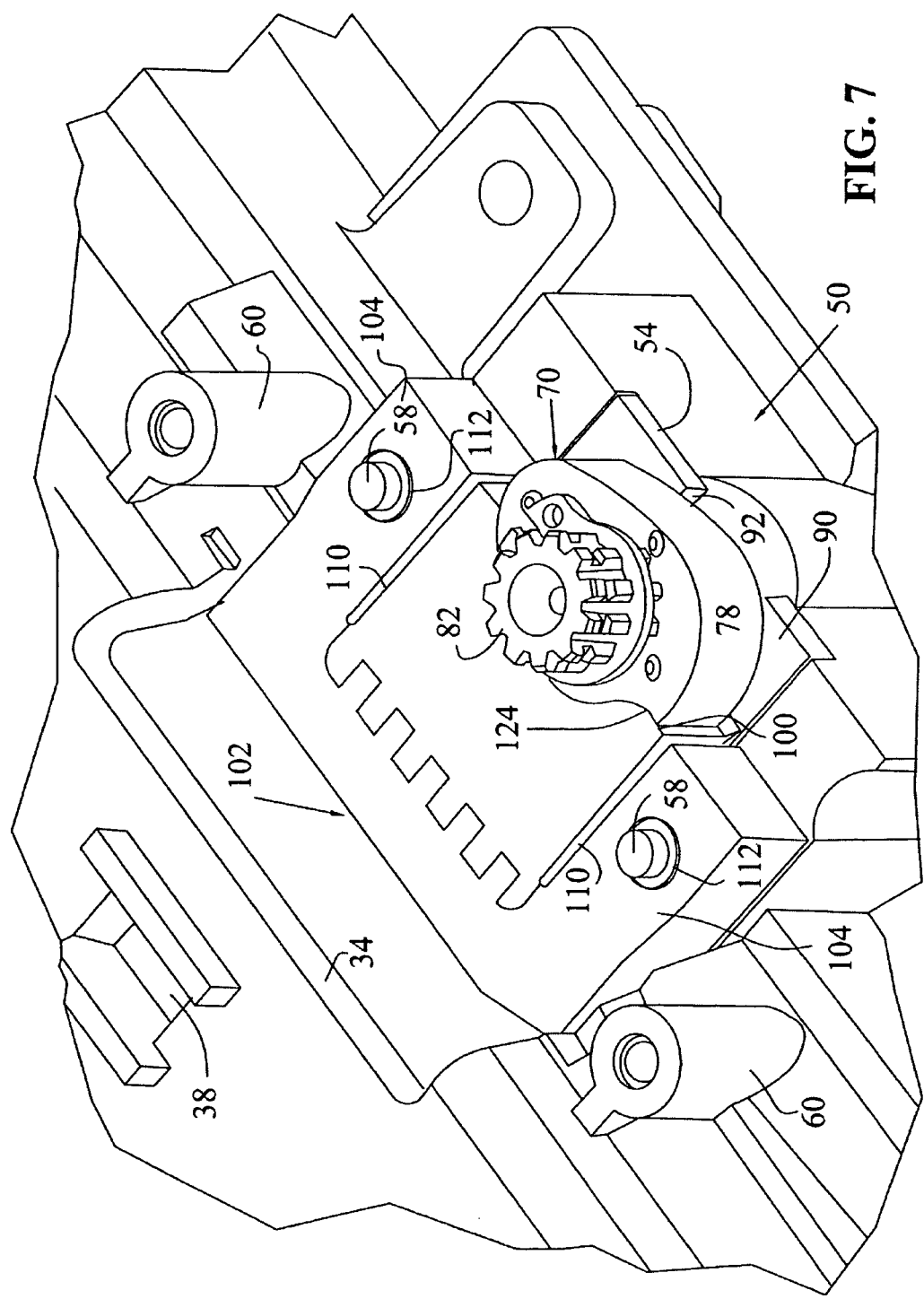
FIG. 7 shows an enlarged view of the cam member positioned against the gripper assembly.
Figure 8:
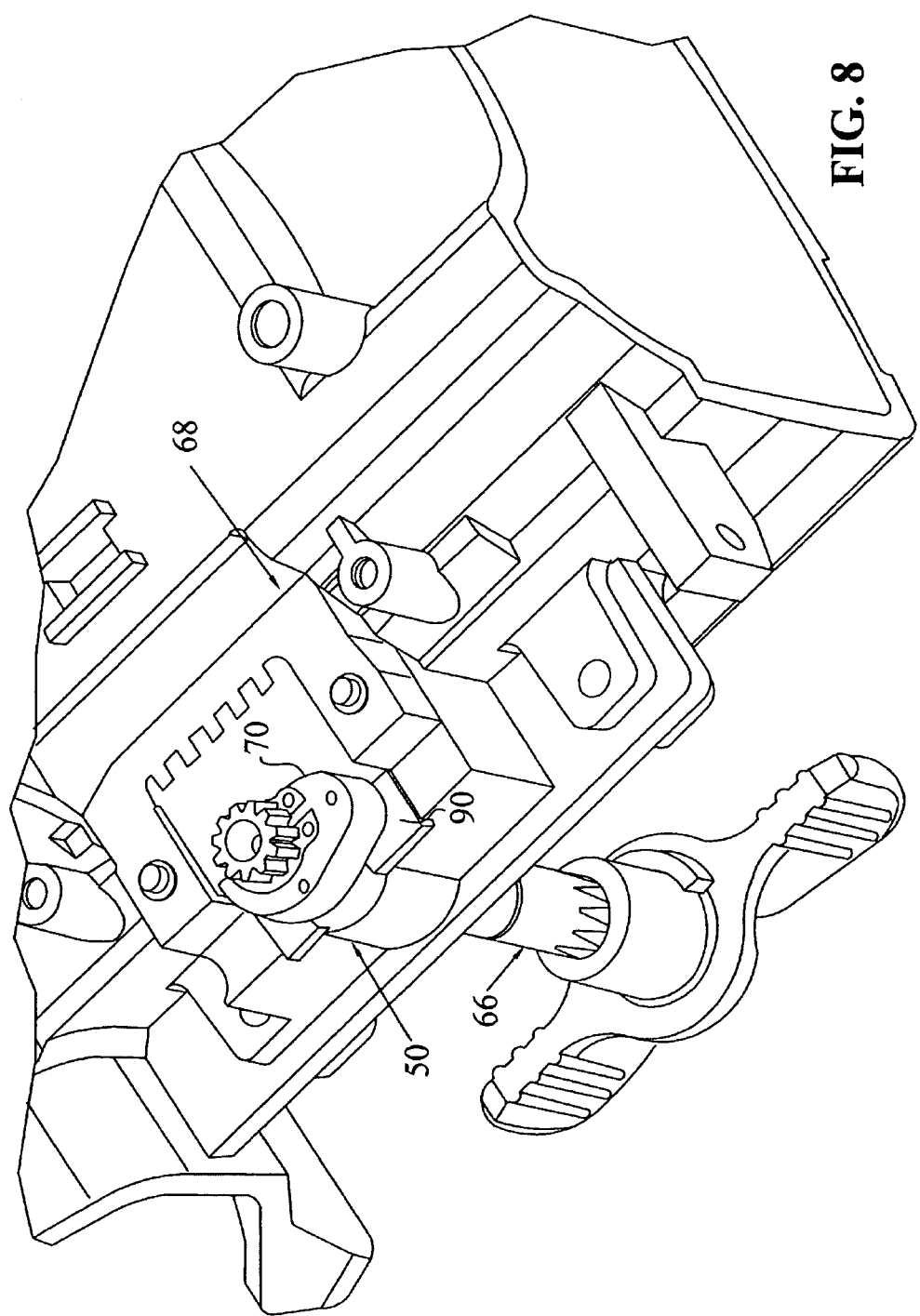
FIG. 8 shows a similar view from the opposite side.

With reference first to FIGS. 7 and 8, the first portion of the assembly is shown where slider member 90 is positioned on recessed surface 54 with apertures 112 placed over bosses 58. This positions U-shaped opening 92 in a flanking relation with aperture 56 (FIG. 4). Splined shaft 66 can now be positioned through aperture 56 (FIG. 4) and through cam member 70, with splined end 82 positioned in splined bore 122. As shown in FIG. 7, this positions friction member 102 adjacent to window 34. It should be noted from FIG. 7 the manner in which scalloped portion 124 of cam member 70 resides on stop surface 100 such that, when in this position, a good detented "feel" is provided. It should also be noted from FIG. 7 that a portion of post 58 extends upwardly from the top of gripper legs 104.

Figure 6:
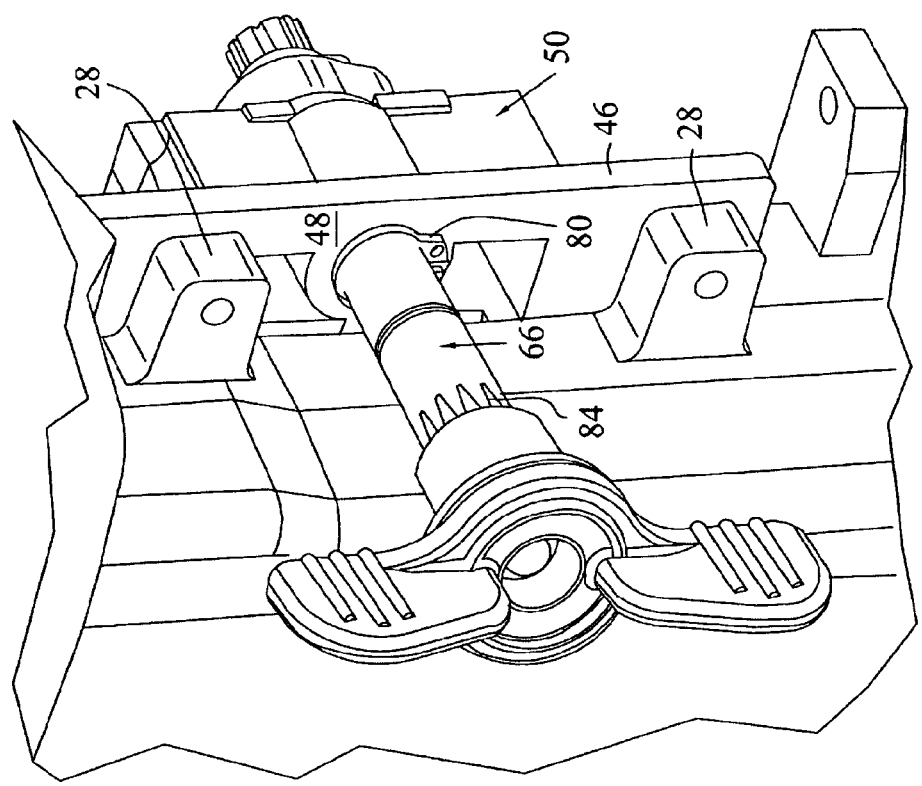
FIG. 6 shows an exploded view of the installed camming assembly similar to that shown in FIG. 2.
Figure 9:
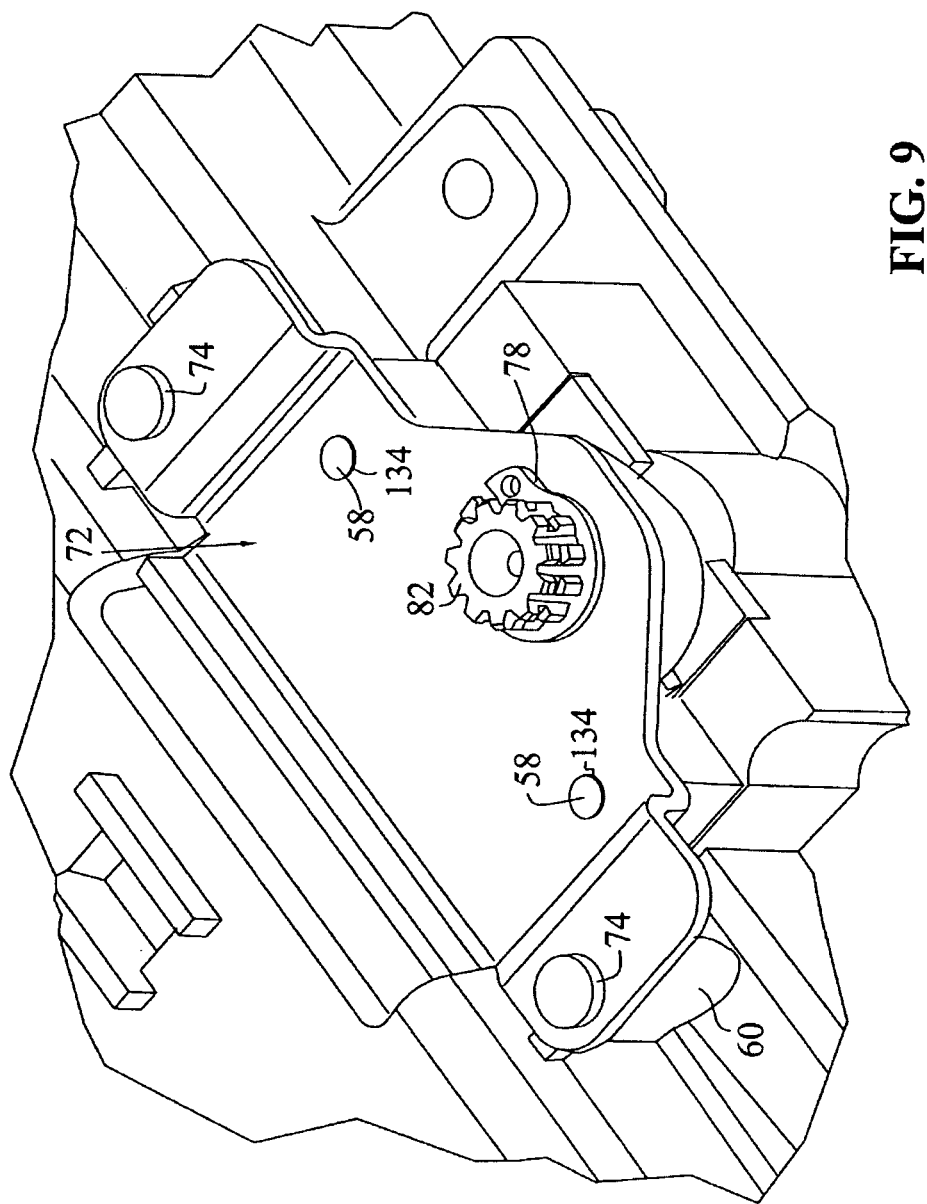
FIG. 9 shows a view similar to that of FIG. 7 with the insert cover in place.

With respect now to FIG. 9, gripper cover 72 is now positioned over gripper member 68 with aperture 132 (FIG. 5) over splined end 82 of shaft 66, and with apertures 134 overlying the extended portion of post 58. This also aligns apertures 138 (FIG. 5) with posts 60 and screws 74 can be positioned in place to hold the gripper cover 72 in place, which in turn holds the gripper member 68. When in this position, snap ring 78 can be positioned over splined end 82 to hold the spline shaft 66 in place. Also as shown in FIG. 6, in the assembled position, shaft end 84 extends from the front side of the surface 48 with snap ring 80 holding the shaft 66 in housing portion 50.

With the above-described assembly, the sleeve 6 is now configured substantially as shown in FIG. 2 and can now be slidably received in the outer casing 4 (FIG. 1). This positions shaft end 84 adjacent to an aperture 140. As shown in FIG. 2, wing nut handle 142 includes a splined shank portion 144, which projects through opening 140 and engages with shaft end 84. The charger assembly 2 is now configured as shown in FIG. 1, whereby rotation of wing nut handle 142 through a 90° rotation turns shaft 66 and resultantly operates cam 70. It should be appreciated that the unlocked position of the cam is shown, for example, in FIG. 7 and turning the handle 142 to the position shown in FIG. 1, moves the cam member 90° to the position shown in FIG. 10.

Figure 10:
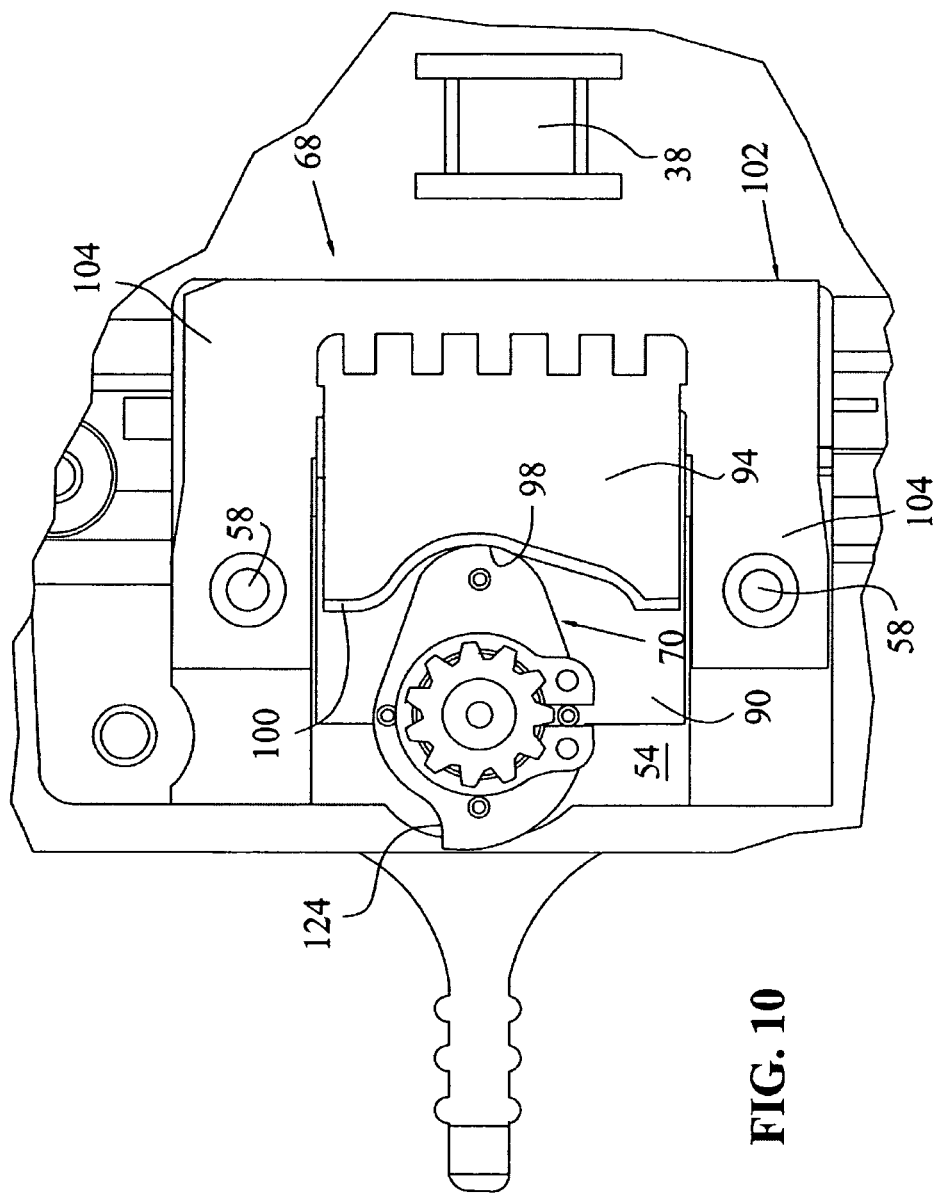
FIG. 10 shows the cam member in the engaged position with the gripper fully inserted into the respective cavity.
Figure 11:
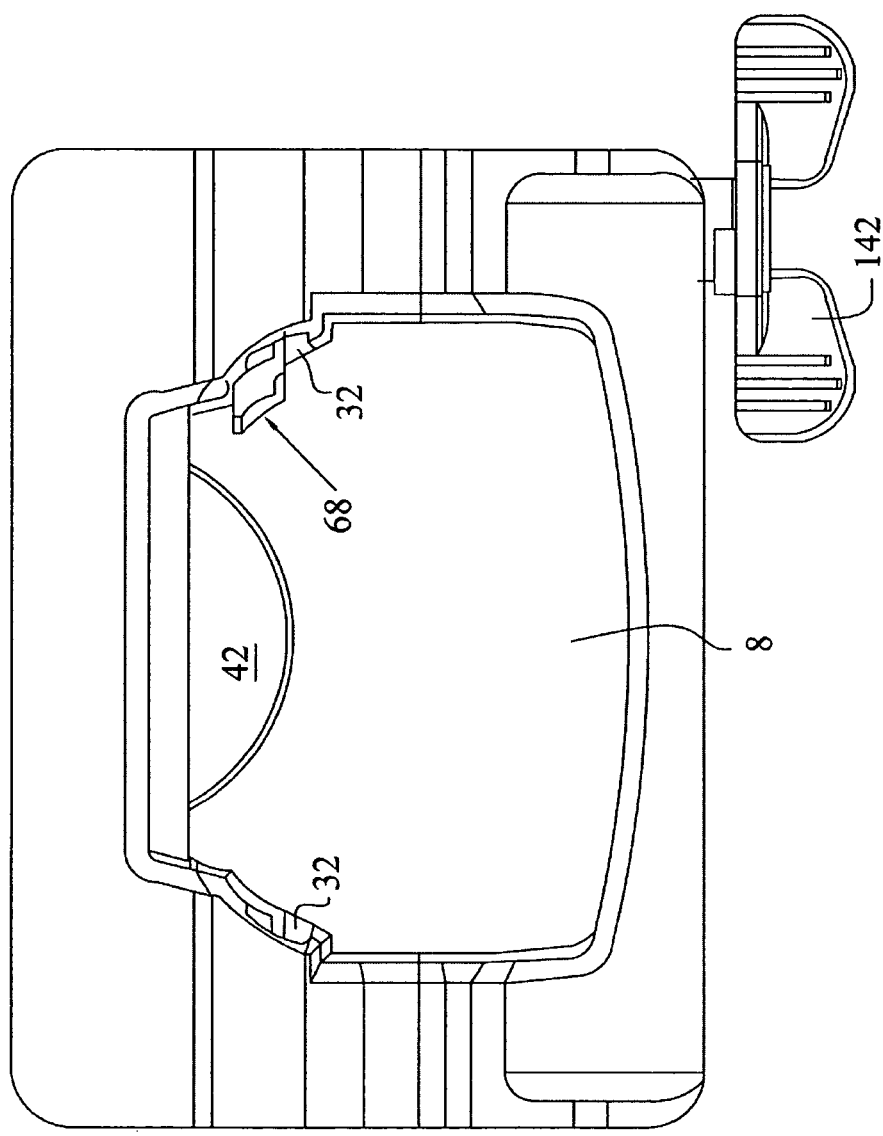
FIG. 11 shows an upper plan view of the housing of FIG. 3, showing the gripper in the fully locked position.

As shown in FIG. 10, cam 70 is rotated to the position where it pushes gripper member 68 into the cavity 8 to grip a battery. This is best shown in FIG. 11. Thus, when a battery requires charging, the battery is slidably received into cavity 8 with ribs on the battery aligned with grooves 32, as shown in FIG. 11. The battery is slidably received axially into the cavity 8 until it resides against shoulder 42. Wing nut handle 142 is thereafter rotated by 90°, whereby cam 90 is moved to the position shown in FIG. 10, and gripper assembly 68 projects into cavity 8, also as shown in FIG. 11, which grips the battery and holds it in place.

Advantageously, the design of the cam actuator operates to provide a good tactile feel for the charger assembly. As shown in FIG. 10, when the cam is in the locked position, the cam resides within a detent 98, providing a sure locked position. Also, as the leg portions 104 of the gripper portion 102 are fixed on posts 58, when moved to the locked position of FIG. 10, the legs stretch, and therefore provide a spring action for the retraction of the gripper member 68 when the handle is moved to the unlocked position. Said differently, and as viewed in FIG. 10, as the cam rotates in the clockwise direction, past the detent 98, the legs 104, being in tension, assist the movement of the gripper member to the left, to the retracted position, assisting in the rotation of the cam clockwise. When the cam rotates to a position 900 from the position shown in FIG. 10, the cam is nested due to the contour of the cam 70 cam follower member 96 such that the scalloped portion 124 of the cam resides in the nested position against stop surface 100.

Thus, the battery charger assembly 2 as shown in FIG. 1 can be mounted within a vehicle and used to adequately retain either a battery or the battery attached to its appliance without coming loose from the charger. As mentioned above, cavity 8 is profiled to receive the battery and its appliance or receive the battery alone, where ribs on the battery are received in alignment grooves 32 to position the battery and its contacts in charging registration with charging contacts which project through apertures 38.

The invention claimed is:

1. A battery charger assembly, comprising:
    a housing having a battery receiving cavity, said cavity being profiled to receive at least a battery therein, said housing further comprising an opening through said housing and into said cavity;
    electrodes for contacting contacts on the battery for charging the battery;
    a cam assembly; and
    a gripping member comprised of a gripper portion attached to an insert, said gripping member operatively connected to said cam assembly, and movable transversely into and out of said housing opening by operation of said cam assembly, between a locked and unlocked position, the gripping member being forced transversely into the battery in the locked position for frictionally gripping the battery placed within said cavity.

2. The battery charger assembly of claim 1, wherein said cam assembly is comprised of a rotatable cam which operates within a follower groove in said insert.

3. The battery charger assembly of claim 2, wherein said rotatable cam and said follower groove are contoured for a nested position when in the unlocked position.

4. The battery charger assembly of claim 2, wherein said rotatable cam and said follower groove are contoured for a detented position when in the locked position.

5. The battery charger assembly of claim 1, wherein said gripper member is a rubber-like material molded to a plastic insert.

6. The battery charger assembly of claim 5, wherein said gripper member is substantially U-shaped, with leg portions of the U flanking said insert, and the closed end of the U providing the gripping function.

7. The battery charger assembly of claim 6, wherein the leg portions of gripper member are fixed to the housing portion, and the movement of the cam stretches the remainder of the gripper member.

8. The battery charger assembly of claim 1, wherein said battery receiving cavity is profiled to receive the battery alone, or the battery connected to its hand-held appliance.

9. The battery charger assembly of claim 8, wherein said cavity includes guides along the insertion axis of the cavity for holding the battery alone.

10. The battery charger assembly of claim 9, wherein said guides are comprised of guide grooves along the insertion axis of the cavity, and are profiled to receive ribs along an exterior of the battery.

11. A battery charger assembly, comprising:
    a housing having a battery receiving cavity, said cavity being profiled to receive a battery therein alone, or the battery and its appliance therein, said housing further comprising an opening though said housing and into said cavity;
    electrodes for contacting contacts on the battery for charging the battery; and
    a cam operated gripping member, comprised of a gripper portion attached to an insert, movable transversely into and out of said housing opening under the influence of said cam, between a locked and unlocked position, for gripping the battery placed within said cavity.

12. The battery charger assembly of claim 11, wherein said cam operated gripping assembly is comprised of a rotatable cam which operates within a follower groove in said insert.

13. The battery charger assembly of claim 12, wherein said cam member is operated by a shaft which is connected to said cam member, and extends through to an exterior of said housing.

14. The battery charger assembly of claim 11, wherein said gripper member is a rubber-like material molded to a plastic insert.

15. The battery charger assembly of claim 14, wherein said rotatable cam and said follower groove are contoured for a nested position when in the unlocked position.

16. The battery charger assembly of claim 14, wherein said rotatable cam and said follower groove are contoured for a detented position when in the locked position.

17. The battery charger assembly of claim 14, wherein said gripper member is substantially U-shaped, with leg portions of the U flanking said insert, and the closed end of the U providing the gripping function.

18. The battery charger assembly of claim 17, wherein the leg portions of gripper member are fixed to the housing portion, and the movement of the cam stretches the remainder of the gripper member.

19. The battery charger assembly of claim 11, wherein said cavity includes guides along the insertion axis of the cavity for holding the battery alone.

20. The battery charger assembly of claim 19, wherein said guides are comprised of guide grooves along the insertion axis of the cavity, and are profiled to receive ribs along an exterior of the battery.

* * * * *